(12) United States Patent
Yatsuda et al.

(10) Patent No.: US 6,845,462 B2
(45) Date of Patent: Jan. 18, 2005

(54) COMPUTER CONTAINING CLOCK SOURCE USING A PLL SYNTHESIZER

(75) Inventors: Senichiro Yatsuda, Fukushima-ken (JP); Yasuhiro Ikarashi, Fukushima-ken (JP); Yoshitaka Hirose, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 221 days.

(21) Appl. No.: 10/245,096

(22) Filed: Sep. 17, 2002

(65) Prior Publication Data
US 2003/0056132 A1 Mar. 20, 2003

(30) Foreign Application Priority Data

Sep. 19, 2001 (JP) .......................................... 2001-284778
Sep. 20, 2001 (JP) .......................................... 2001-286614

(51) Int. Cl.[7] .............................. G06F 1/06; G06F 1/08; H03L 7/06
(52) U.S. Cl. ......................... 713/501; 331/2; 327/147; 327/295
(58) Field of Search ...................... 331/1 A, 2, 16–18, 331/25; 327/147–150, 156–159, 291, 295–297; 713/500–503

(56) References Cited

U.S. PATENT DOCUMENTS 5,586,308 A * 12/1996 Hawkins et al. ............ 713/501
5,778,237 A *  7/1998 Yamamoto et al. ......... 713/322

FOREIGN PATENT DOCUMENTS

JP          8-0054955        2/1996

* cited by examiner

*Primary Examiner*—David Mis
(74) *Attorney, Agent, or Firm*—Brinks Hofer Gilson & Lione (57) ABSTRACT

A computer of the present invention contains: a CPU; plural peripheral devices controlled by the CPU; a data transmission bus between the CPU and the peripheral devices and between the peripheral devices; and a clock signal source for supplying clock signals for CPU operation and data transmission. The clock signal source contains a PLL synthesizer, and two clock signals (one for the CPU and the other for the bus) are outputted from the PLL synthesizer to stop unnecessary signals (other than the clock signals) from being produced.

16 Claims, 5 Drawing Sheets

COMPUTER CONTAINING CLOCK SOURCE USING A PLL SYNTHESIZER

BACKGROUND OF THE INVENTION

1. Field of the Invention

The present invention relates to a computer, and more particularly to the configuration of a clock signal source for running the computer. It also relates to a computer having a power saving function.

2. Description of the Prior Art

Figure 8:
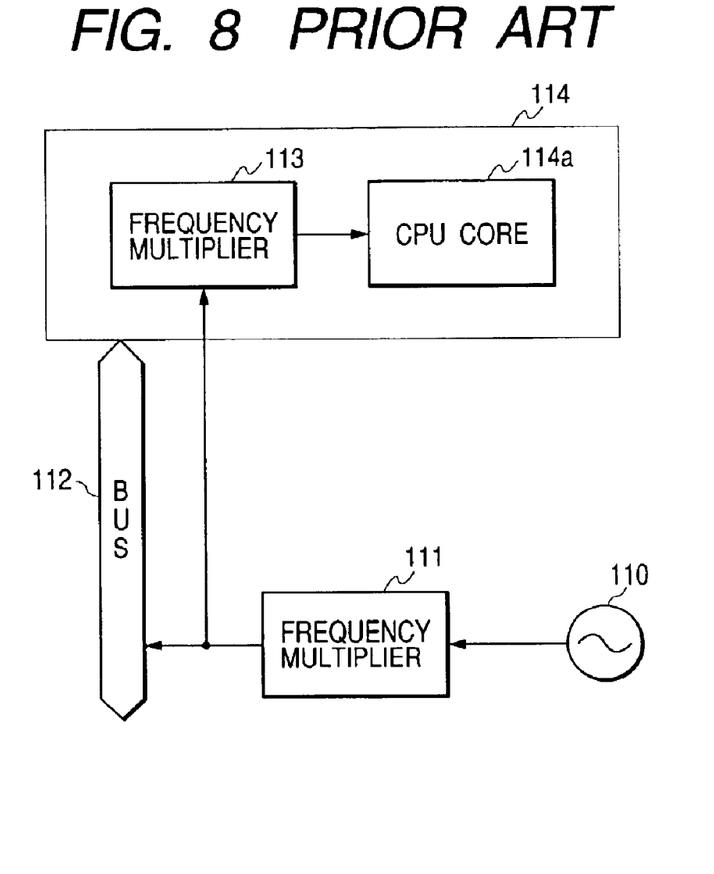
FIG. 8 is a block configuration diagram showing a clock signal source of a conventional computer.

A conventional clock signal source used in personal computers and the like, as shown in FIG. 8, comprises a combination of a reference oscillator 110 and frequency multipliers 111 and 113 provided within a computer. In FIG. 8, the reference oscillator 110 oscillates at several megahertz and the frequency of an oscillation signal is multiplied tens of times to an appropriate frequency by the first frequency multiplier 111. The multiplied signal is used as a clock signal for a bus 112 within the computer.

The signal multiplied by the first frequency multiplier 111 is multiplied to a higher frequency by the second frequency multiplier 113. The second frequency multiplier 113 is provided within the CPU 114 of the computer. A signal multiplied by the second frequency multiplier 113 is used as a clock signal for a CPU core 114a.

In some portable battery-powered computers such as notebook size personal computers, if power is on but no operation is performed for a certain period of time, the frequency of a clock signal is reduced to switch to a power save mode, thereby preventing the consumption of the battery.

Figure 9:
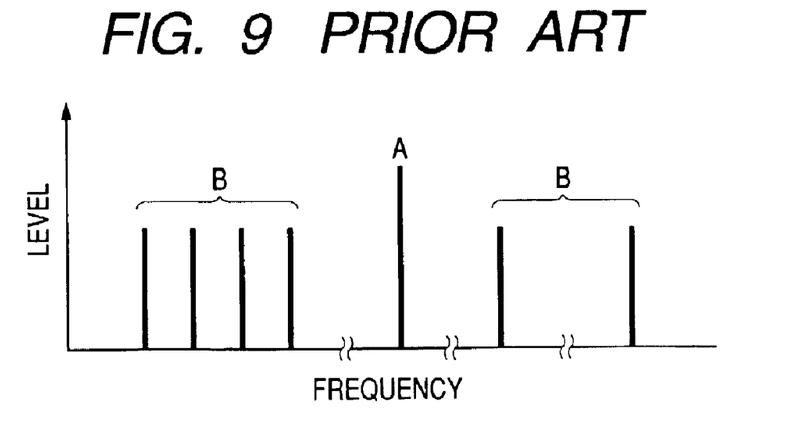
FIG. 9 is a diagram showing a state of an unnecessary signal occurring in a conventional computer.

In the above conventional configuration in which a signal multiplied by the multipliers is used as a clock signal, as shown in FIG. 9, aside from a signal A of a desired frequency (e.g., an output signal of the second multiplier), many unnecessary signals B occur over a wide frequency range. In them, harmonics of signals multiplied by the first or second frequency multiplier are contained. Such unnecessary signals B invade various circuits through the bus within the computer and cause the circuits to malfunction.

Also, the unnecessary signals B leak out of the computer and invade circuits of other devices, causing the circuits to malfunction. Accordingly, the computer should be adequately shielded to prevent unnecessary signals from leaking out of the computer.

Also, as shown in FIG. 8, in the above conventional configuration in which the CPU 114 incorporates the second frequency multiplier 113, the current consumption and heat output of the CPU 114 are large, requiring the CPU 114 to be provided with a heat expelling plate or the like to expel heat.

Also, in the above conventional configuration in which a signal multiplied by the multipliers is used as a clock signal, aside from a signal of a desired frequency, many unnecessary signals occur over a wide frequency range. In them, unnecessary spurious outputted from the first frequency multiplier and unnecessary spurious outputted from the second frequency multiplier are contained.

Such unnecessary signals invade various circuits through a bus or the like within equipment such as a personal computer and cause the circuits to malfunction.

Also, such unnecessary signals are radiated out of the personal computer, causing interference with other electronic devices.

Since the frequency multiplier uses nonlinear characteristics to generate harmonics and takes out of them only harmonics having necessary frequencies, a configuration for switching frequencies is complicated.

SUMMARY OF THE INVENTION

Accordingly, an object of the present invention is to arrest the occurrence of unnecessary multiplication-induced signals that cause malfunctions and interference with other electronic devices, and to reduce the current consumption and heating of the CPU 114.

Another object of the present invention is to enable the use of a clock signal containing very few unnecessary signals such as harmonics and to enable the frequency of the clock signal to be easily reduced at a power save mode.

To solve the above problems, a computer of the present invention comprises: a CPU; plural peripheral devices controlled by the CPU; a data transmission bus between the CPU and the peripheral devices, and between the peripheral devices; and a clock signal source for supplying clock signals for operation of the CPU and the data transmission, wherein the clock signal source is constituted by a PLL synthesizer.

The PLL synthesizer outputs two signals whose frequencies are different from each other, with one of them as a clock signal for the CPU and the other as a clock signal for the data transmission.

The PLL synthesizer includes a voltage control oscillator for outputting one of the signals and a frequency divider for dividing a frequency of the signal to output another of the signals from the frequency divider.

The frequency divider is configured to be able to change frequency division ratios.

The PLL synthesizer comprises a first PLL synthesizer having a first voltage control oscillator and a second PLL synthesizer having a second voltage control oscillator, wherein the first voltage control oscillator outputs one of the signals and the second voltage control oscillator outputs another of the signals.

The first PLL synthesizer is provided with a first frequency divider for dividing a frequency of an oscillation signal outputted from the first voltage control oscillator, a second PLL synthesizer is provided with a second frequency divider for dividing a frequency of an oscillation signal outputted from the second voltage control oscillator, and the first and second frequency dividers each are constituted by a variable frequency divider.

The PLL synthesizer has a reference oscillator that supplies a reference signal commonly to the first and second PLL synthesizers.

To solve the above problems, a computer of the present invention comprises: a CPU; plural peripheral devices controlled by the CPU; a data transmission bus between the CPU and the peripheral devices, and between the peripheral devices; and a clock signal source for supplying clock signals to the CPU and the bus, wherein the clock signal source is constituted by a PLL synthesizer and an output frequency of the PLL synthesizer is reduced at a power save mode.

The PLL synthesizer outputs two signals whose frequencies are different from each other, with one of them as a clock signal for the CPU and the other as a clock signal for the bus.

The PLL synthesizer comprises: a PLL circuit having at least a voltage control oscillator; a reference oscillator for supplying a reference signal to the PLL circuit; a first frequency divider for dividing a frequency of an oscillation signal outputted from the voltage control oscillator; and a second frequency divider for dividing a frequency of a signal frequency-divided by the first frequency divider, wherein a frequency-divided signal outputted from the first frequency divider is supplied to the CPU, a frequency-divided signal outputted from the second frequency divider is supplied to the bus, and a frequency division ratio of the first frequency divider is set higher at the power save mode.

The PLL synthesizer comprises: a PLL circuit having at least voltage control oscillating means and a first frequency divider for dividing a frequency of an oscillation signal of the voltage control oscillating means; a reference oscillator for supplying a reference signal to the PLL circuit; and a second frequency divider for dividing the frequency of the oscillation signal, wherein the oscillation signal is supplied to the CPU, a frequency-divided signal outputted from the second frequency divider is supplied to the bus, and a frequency division ratio of the first frequency divider is set lower at the power save mode.

The voltage control oscillating means are alternatively selected, one of them comprising two voltage control oscillators making up the PLL circuit, wherein one voltage control oscillator is selected at the power save mode, and at a normal mode other than the power save mode, another voltage control oscillator is selected.

A frequency division ratio of the second frequency divider can be changed.

The PLL synthesizer comprises: a first PLL circuit having at least voltage control oscillating means and a first frequency divider; a second PLL circuit having at least a voltage control oscillator; and a reference oscillator for supplying a reference signal to the first PLL circuit and the second PLL circuit, wherein an oscillation signal outputted from the voltage control oscillating means is supplied to the CPU, an oscillation signal outputted from the voltage control oscillator is supplied to the bus, and a frequency division ratio of the first frequency divider is set lower at the power save mode.

The voltage control oscillating means are alternatively selected, one of them comprising two voltage control oscillators making up the first PLL circuit, wherein one voltage control oscillator is selected at the power save mode, and at a normal mode other than the power save mode, another voltage control oscillator is selected.

The second PLL circuit is provided with a second frequency divider for setting an oscillation frequency of the voltage control oscillator, wherein the second frequency divider can be changed.

BRIEF DESCRIPTION OF THE DRAWINGS

Preferred embodiments of the present invention will be described in detail based on the followings, wherein.

DESCRIPTION OF THE PREFERRED EMBODIMENTS

Hereinafter, a first embodiment of a computer of the present invention is described with reference to FIGS. 1 and 2.

Figure 1:
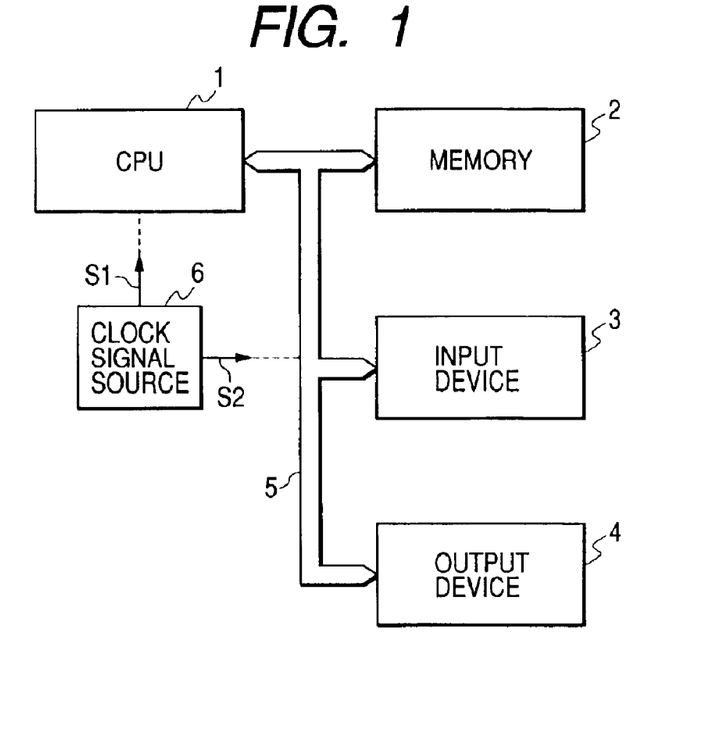
FIG. 1 is a block diagram showing an embodiment of a computer of the present invention.

FIG. 1 is a block diagram showing a configuration of a computer in a first embodiment of the present invention. The computer is made up of CPU 1, and peripheral devices 2, 3, and 4 such as memory, input device, and output device. Data is transmitted between the CPU 1, and the peripheral devices 2, 3, and 4 through a bus 5. The computer requires a clock signal (referred to as a CPU clock signal) for running the CPU and a clock signal (referred to as a bus clock signal) for transmitting data through the bus 5, and a clock signal source 6 for the signals is provided within the computer. Two signals S1 and S2 are outputted from the clock signal source 6, with the signal S1 used as a CPU clock signal and the signal S2 as a bus clock signal.

Figure 2:
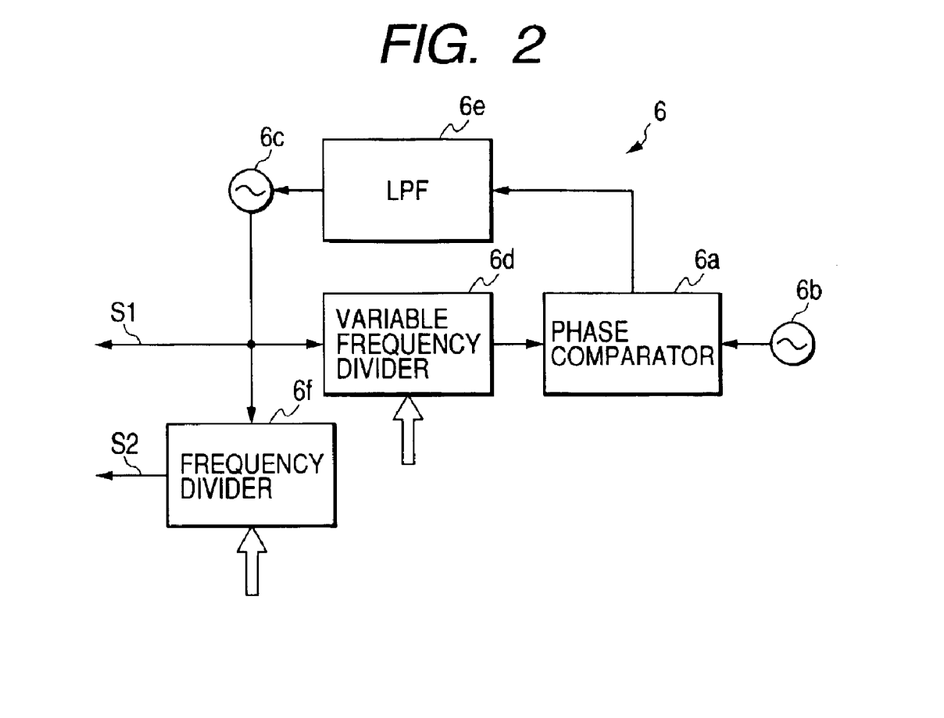
FIG. 2 is a block configuration diagram showing a clock signal source used in the computer of the present invention.

The clock signal source 6 is constituted by a PLL synthesizer as shown in FIG. 2. In FIG. 2, one input end of a phase comparator 6a is supplied with a reference signal from a reference oscillator 6b and another input end is supplied with a signal outputted from a voltage control oscillator 6c after being appropriately frequency-divided by a variable frequency divider 6d.

The phase comparator 6a compares the phases of two inputted signals and outputs an error signal indicating an error between the two signals. The error signal is smoothed by a low pass filter 6e and a smoothed DC voltage is applied to a voltage control oscillator 6c as a control voltage. Thereby, the voltage control oscillator 6c oscillates at a frequency set by a frequency division ratio of the variable frequency divider 6d.

A signal outputted from the voltage control oscillator 6c is also inputted to a frequency divider 6f. The frequency divider 6f may be a fixed frequency divider having a fixed frequency division ratio but may also be constituted by a variable frequency divider changeable in frequency division ratio. A frequency-divided signal is outputted from the frequency divider 6f.

The signal S1 outputted from the voltage control oscillator 6c serves as a CPU clock signal and the signal S2 outputted from the frequency divider 6f serves as a bus clock signal.

As described above, since the computer of the present invention produces clock signals by the PLL synthesizer, the occurrence of unnecessary signals other than clock signals is reduced and the computer malfunctions less frequently. If the frequency dividers 6d and 6f are configured to change in frequency division ratio, the frequencies of the two outputted signals can be appropriately set so as to meet the specifications of the computer.

Figure 3:
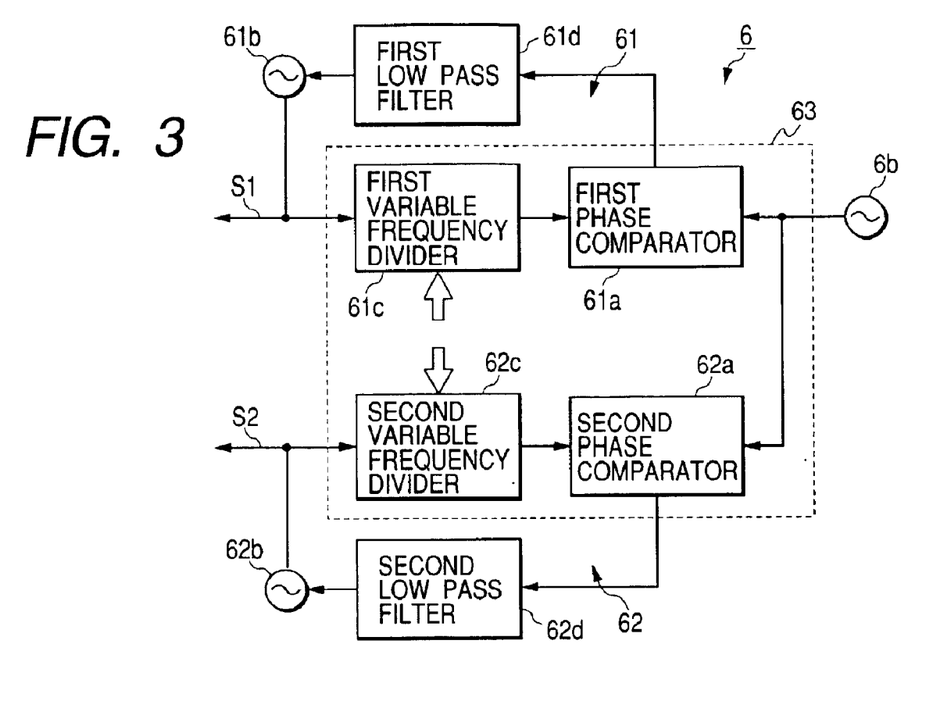
FIG. 3 is another block configuration diagram showing a clock signal source used in the computer of the present invention.

FIG. 3 shows another configuration of the signal source 6 in the computer of the present invention; in this embodiment, two PLL synthesizers are used. In a first PLL synthesizer 61, one input end of a first phase comparator 61a is supplied with a reference signal from a reference oscillator 6b and another input end is supplied with a signal outputted from a first voltage control oscillator 61b after being appropriately frequency-divided by a first variable frequency divider 61c.

The first phase comparator 61a compares the phases of two inputted signals and outputs an error signal indicating an error between the two signals. The error signal is smoothed by a first low pass filter 61d and a smoothed DC voltage is applied to a first voltage control oscillator 61b as a control voltage. Thereby, the first voltage control oscillator 61b oscillates at a frequency set by a frequency division ratio of the, first variable frequency divider 61c and outputs one signal S1.

In a second PLL synthesizer 62, one input end of a phase comparator 62a is supplied with a reference signal from a reference oscillator 6b and another input end is supplied with a signal outputted from a second voltage control oscillator 62b after being appropriately frequency-divided by a second variable frequency divider 62c.

The second phase comparator 62a compares the phases of two inputted signals and outputs an error signal indicating an error between the two signals. The error signal is smoothed by a second low pass filter 62d and a smoothed DC voltage is applied to a second voltage control oscillator 62b as a control voltage. Thereby, the second voltage control oscillator 62b oscillates at a frequency set by a frequency division ratio of the second variable frequency divider 62c and outputs another of the signals S2. The signal S2 is lower in frequency than the signal S1 outputted from the first voltage control oscillator 61b.

The signal S1 outputted from the first voltage control oscillator 61b serves as a CPU clock signal and the signal S2 outputted from the second voltage control oscillator 62b serves as a bus clock signal.

The first phase comparator 61a and the first variable frequency divider 61c in the first PLL synthesizer 61, and the second phase comparator 62a and the second variable frequency divider 62c in the second PLL synthesizer 62 are configured within one PLL integrated circuit 63. A reference signal is commonly inputted to the first phase comparator 61a and the second phase comparator 62a from the reference oscillator 6b.

The configuration of FIG. 3 also helps to increase resistance to computer malfunction because unnecessary signals are minimized.

Figure 4:
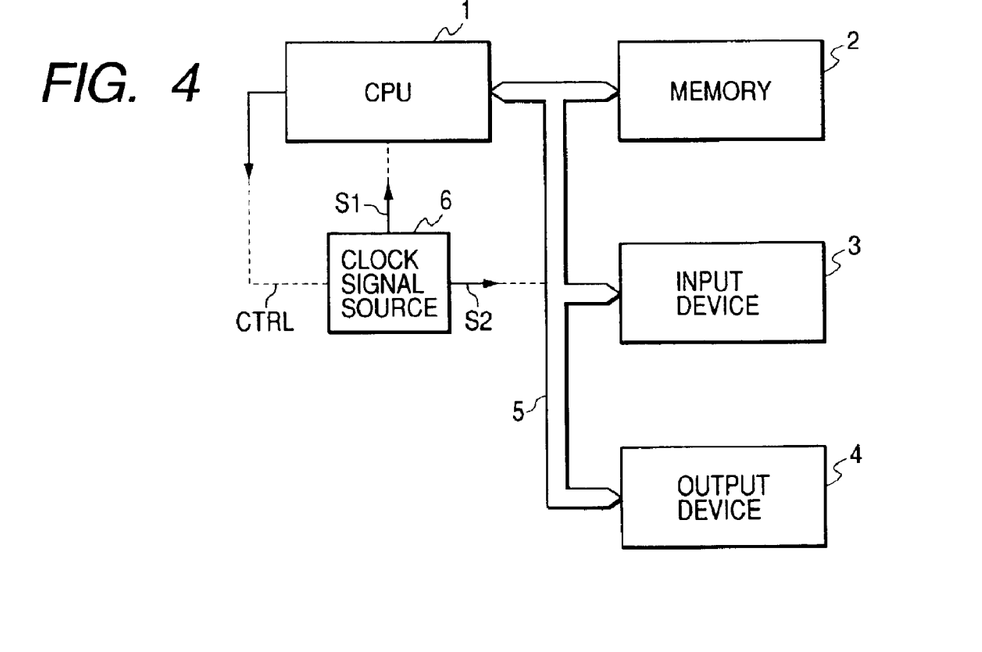
FIG. 4 is a block configuration diagram of a computer of the present invention.
Figure 5:
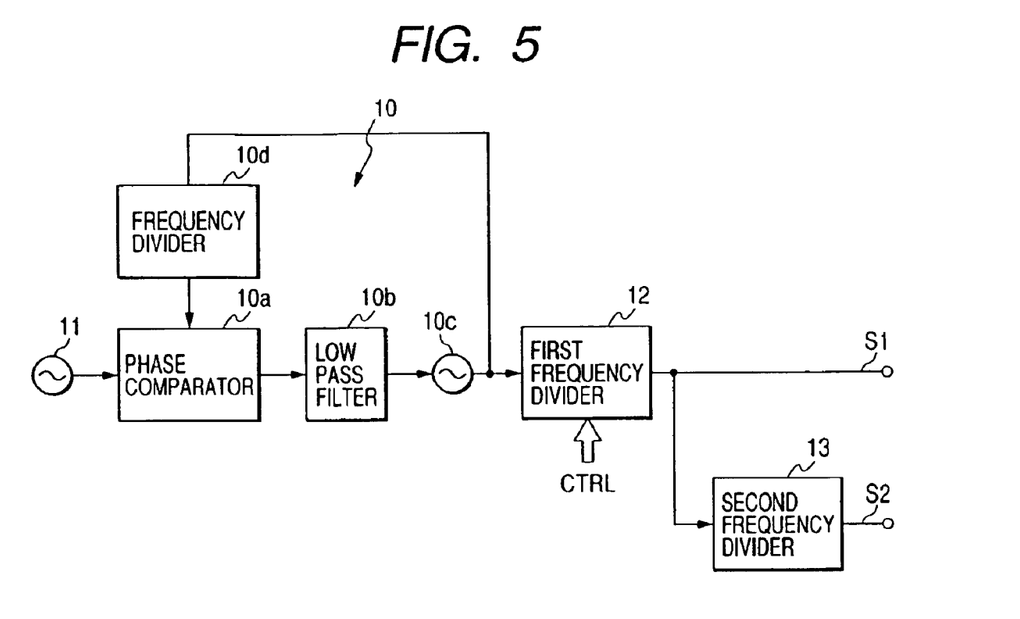
FIG. 5 is a schematic circuit diagram showing a first configuration of a clock signal source used in the computer of the present invention.
Figure 6:
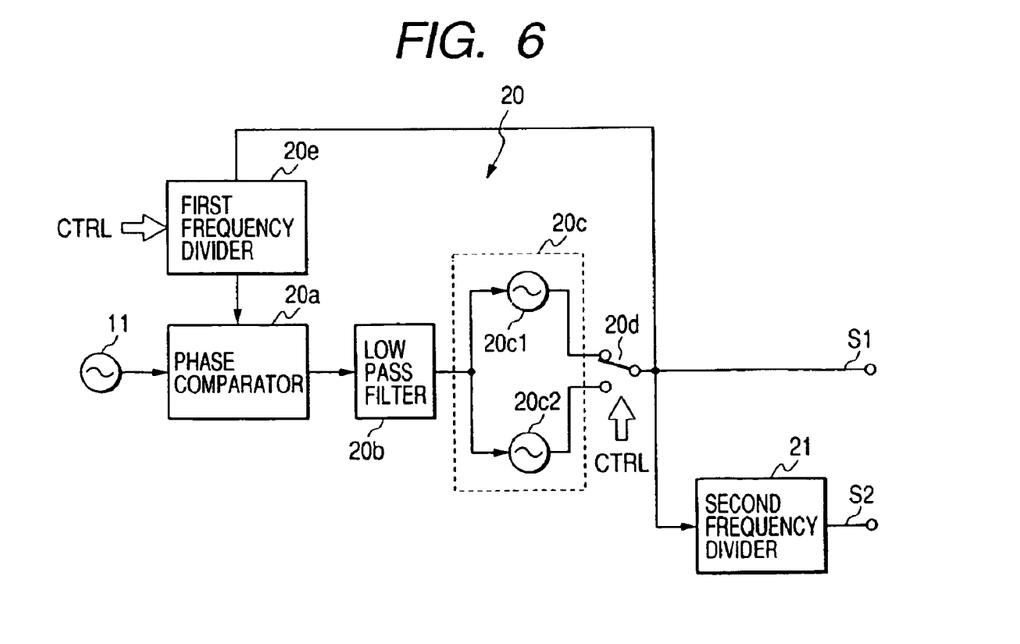
FIG. 6 is a schematic circuit diagram showing a second configuration of a clock signal source used in the computer of the present invention.
Figure 7:
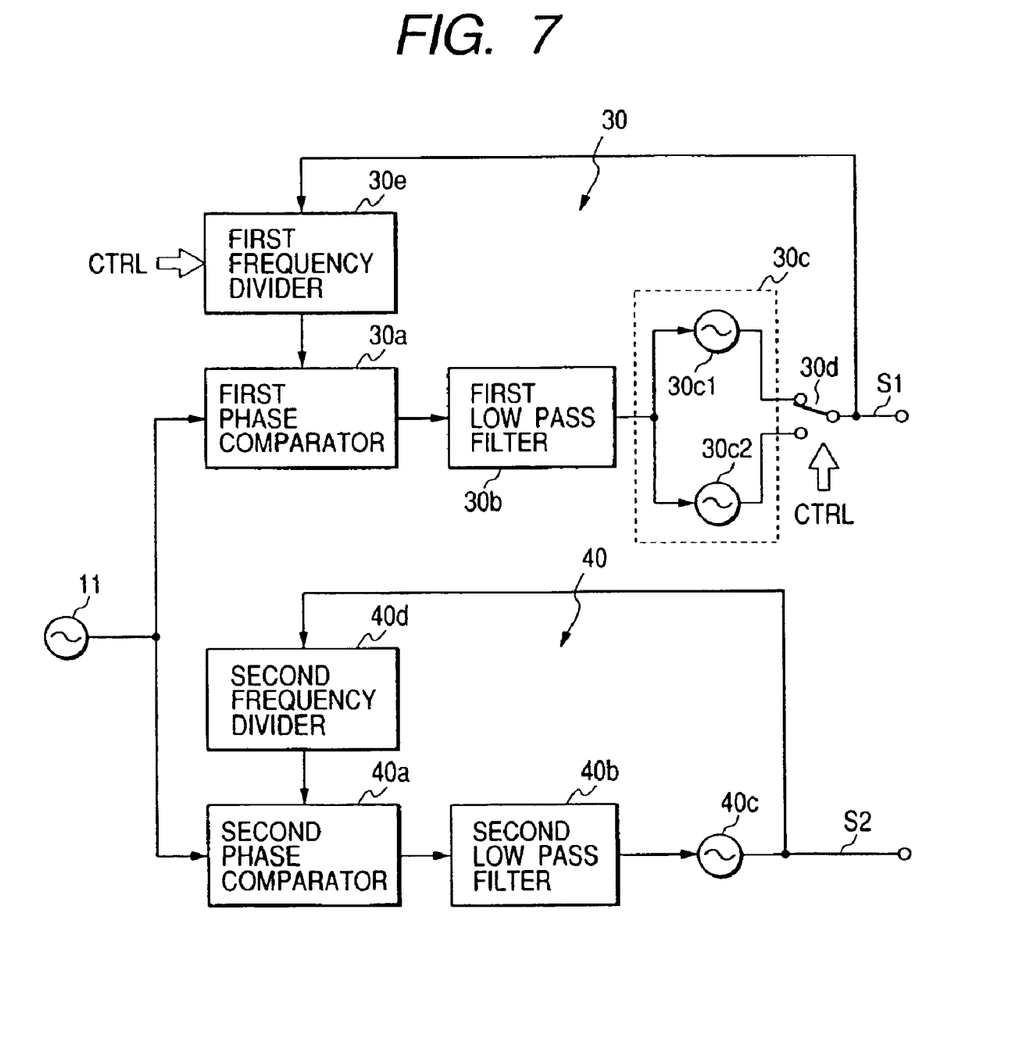
FIG. 7 is a schematic circuit diagram showing a third configuration of a clock signal source used in the computer of the present invention.

Next, second to fourth embodiments of the computer of the present invention are described. FIG. 4 is a block diagram showing a configuration of the computer in the embodiments of the present invention. FIGS. 5 to 7 show concrete configurations of clock signal sources used in the present invention.

In FIG. 4, the computer is made up of CPU 1, and peripheral devices 2, 3, and 4 such as memory, input device, and output device. Data is transmitted between the CPU 1, and the peripheral devices 2, 3, and 4 through a bus 5. The computer requires a clock signal (referred to as a CPU clock signal) for running the CPU 1 and a clock signal (referred to as a bus clock signal) for transmitting data through the bus 5, and a clock signal source 6 for the signals is provided within the computer. Two signals S1 and S2 are outputted from the clock signal source 6, with the signal S1 used as a CPU clock signal and the signal S2 as a bus clock signal. The CPU clock signal is higher in frequency than the bus clock signal.

If the computer is operated as usual in the configuration described above, the CPU clock signal and the bus clock signal operate at predetermined high frequencies, while, if the computer is not operated for a certain period of time, to prevent the consumption of a battery used as power supply, the CPU 1 sends a control signal CTRL to the signal source 6 to lower the frequency of the clock signal so that the system is switched to a power-off save mode.

In the present invention, the clock signal source 6 is constituted by a PLL synthesizer employing a PLL circuit.

Hereinafter, referring to FIGS. 5 to 7, a PLL synthesizer as the clock signal line 6 is described. FIG. 5 shows a second embodiment; FIG. 6, a third embodiment; and FIG. 7, a fourth embodiment.

In FIG. 5, a PLL circuit 10 is formed by a closed loop consisting of a phase comparator 10a, a low pass filter lob, a voltage control oscillator 10c, and a frequency divider 10d, and a reference signal is supplied to a phase comparator 10a from a reference oscillator 11. The operation of a PLL circuit is well known and is not described herein; an oscillation frequency of the voltage control oscillator 10c is set by the frequency divider 10d within the PLL circuit 10. The frequency divider 10d may be configured to be fixed or changeable in frequency division ratio.

An oscillation signal outputted from the voltage control oscillator 10c is frequency-divided by a first frequency divider 12. The first frequency divider 12 is configured to switch to at least two higher and lower frequency division ratios (higher and lower ones). The frequency division ratios are switched by the control signal CTRL from the CPU 1. A frequency division signal S1 outputted from the first frequency divider 12 is used as a CPU clock signal.

A frequency division signal outputted from the first frequency divider 12 is inputted to a second frequency divider 13. Frequency division ratios of the second frequency divider 13 may be fixed or changeable. A frequency division signal S2 outputted from the second frequency divider 13 is used as a bus clock signal. If the second frequency divider 13 is configured to be changeable in frequency division ratio, the frequencies of the bus clock signal can be changed as required.

In the above configuration, if the computer is operated as usual, the first frequency divider 12 is set to a lower frequency division ratio by the CPU 1, and from the first frequency divider 12, the frequency division signal S1 having a predetermined high frequency necessary for the CPU 1 to operate is outputted. If computer operations are stopped for a certain period of time, the system goes into a power save mode, at which time the first frequency divider 12 is set to a higher frequency division ratio by the control signal CTRL from the CPU 1. At this time, the frequency of the frequency division signal outputted from the first frequency divider 12 is reduced. As a result, power consumption in the computer is decreased.

Next, the configuration of FIG. 6 is described. A PLL circuit 20 is formed by a closed loop consisting of a phase comparator 20a, a low pass filter 20b, a voltage control oscillating means 20c, a switching means 20d, and a first frequency divider 20e, and a reference signal is supplied to a phase comparator 20a from the reference oscillator 11. The first frequency divider 20e is constituted by a variable frequency divider changeable in frequency division ratio. The voltage control oscillating means 20c consists of two voltage control oscillators 20c1 and 20c2, the output signal S1 of one of which is selected by the switching means 20d and inputted to the first frequency divider 20e and used as a CPU clock signal.

The signal S1 selected by the switching means is inputted to a second frequency divider 21, and the frequency division signal S2 outputted from the second frequency divider 21 is used as a bus clock signal. Frequency division ratios of the second frequency divider 21 may be fixed or changeable.

In the above configuration, if the computer is operated as usual, since the first frequency divider 20e is set to a higher frequency division ratio by the CPU 1, the voltage control oscillating means 20c oscillates at a predetermined high frequency necessary for the CPU 1 to operate. In this case, the switching means 20d selects an oscillation signal of one voltage control oscillator 20c1 by the control signal CTRL from the CPU 1.

When the system goes into the power save mode, the first frequency divider 20e is switched to a lower frequency division ratio by the control signal CTRL from the CPU 1. At this time, an oscillation frequency of the voltage control oscillating means 20c decreases. In this case, the switching means 20d selects an oscillation signal from the other voltage control oscillator 20c2 by the control signal CTRL.

In the configuration of FIG. 6, since the two voltage control oscillators 20c1 and 20c2 can be used separately for two (higher and lower) oscillation frequencies, a stable oscillation signal can be obtained for any of the frequencies.

Next, the configuration of FIG. 7 is described. A first PLL circuit 30 is formed by a closed loop consisting of a first phase comparator 30a, a first low pass filter 30b, a voltage control oscillating means 30c, a switching means 30d, and a first frequency divider 30e, and a reference signal is supplied to a first phase comparator 30a from the reference oscillator 11. The first frequency divider 30e is constituted by a variable frequency divider changeable in frequency division ratio. The voltage control oscillating means 30c consists of two voltage control oscillators 30c1 and 30c2, the output signal S1 of one of which is selected by the switching means 30d and inputted to the first frequency divider 30e and used as a CPU clock signal.

A second PLL circuit 40 is formed by a closed loop consisting of a second phase comparator 40a, a second low pass filter 40b, a voltage control oscillator 40c, and a second frequency divider 40d, and a reference signal is supplied to a first phase comparator 40a from the reference oscillator 11. The second frequency divider 40d may be fixed in frequency division ratio or be constituted by a variable frequency divider changeable in frequency division ratio. The oscillation signal S2 outputted from the voltage control oscillator 40c is used as a bus clock signal.

In the above configuration, if the computer is operated as usual, since the first frequency divider 30e is set to a higher frequency division ratio by the-CPU 1, the voltage control oscillating means 30c oscillates at a predetermined high frequency necessary for the CPU 1 to operate. In this case, the switching means 30d selects an oscillation signal of one voltage control oscillator 30c1 by the control signal CTRL from the CPU 1.

When the system goes into the power save mode, the first frequency divider 30e is switched to a lower frequency division ratio by the control signal CTRL from the CPU 1. At this time, an oscillation frequency of the voltage control oscillating means 30c decreases. In this case, the switching means 30d selects an oscillation signal from another voltage control oscillator 30c2 by the control signal CTRL.

In the configuration of FIG. 7, since the two voltage control oscillator 30c1 and 30c2 can be used separately for two (higher and lower) oscillation frequencies, a stable oscillation signal can be obtained for any of the frequencies.

As has been described above, according to the present invention, since a PLL synthesizer is used as a clock signal source, it does not occur that unnecessary signals invade various circuits through the bus within the computer to cause the circuits to malfunction, and leak out of the computer and invade circuits of other devices to cause the circuits to malfunction. As a result, a shield structure for preventing unnecessary signals from leaking out of the computer can be simplified. Also, the heating of the CPU can be reduced.

The PLL synthesizer outputs two signals whose frequencies are different from each other, with one of them as a clock signal for the CPU and the other as a clock signal for the data transmission. Unnecessary signals superimposed on either of the signals are reduced.

The PLL synthesizer includes a voltage control oscillator for outputting one of the signals and a frequency divider for dividing the frequency of the signal to output another of the signals from the frequency divider. With this construction, two signals can be outputted from one PLL synthesizer. Accordingly, the use of the PLL synthesizer will contribute to miniaturization of personal computers.

Since the frequency divider is configured to be able to change frequency division ratios, the frequency of the bus clock signal can be appropriately set according to the use of the computer.

The PLL synthesizer comprises a first PLL synthesizer having a first voltage control oscillator and a second PLL synthesizer having a second voltage control oscillator wherein the first voltage control oscillator outputs one of the signals and the second voltage control oscillator outputs another of the signals. With this construction, the frequencies of the clock signals can be set independently.

Since the first PLL synthesizer is provided with a first frequency divider, a second PLL synthesizer is provided with a second frequency divider, and the first and second frequency dividers each are constituted by a variable frequency divider, the frequencies of the clock signals can be appropriately set to meet the specifications of the computer.

Since the PLL synthesizer has a reference oscillator that supplies a reference signal commonly to the first and second PLL synthesizers, one is sufficient as the number of reference oscillators.

The computer of the present invention comprises: a CPU; plural peripheral devices controlled by the CPU; a bus for data transfer between the CPU and the peripheral devices, and between the peripheral devices; and a clock signal source for supplying a clock signal to the CPU and the bus, wherein the clock signal source is constituted by a PLL synthesizer and the output frequency of the PLL synthesizer is reduced at a power save mode. With this construction, the frequency of the clock signal can be easily changed digitally. The use of the PLL synthesizer arrests the occurrence of unnecessary signals to cause interference, eliminates the possibility of computer malfunctions, and decreases unnecessary signals emitted to the outside, contributing to reduction in interference with other electronic devices.

Since the PLL synthesizer outputs two signals whose frequencies are different from each other, with one of them as a clock signal for the CPU and the other as a clock signal for the bus, the frequency of the two clock signals or one of them can be changed at the power save mode.

The PLL synthesizer comprises: a PLL circuit having at least a voltage control oscillator; a reference oscillator for supplying a reference signal to the PLL circuit; a first frequency divider for dividing a frequency of an oscillation signal outputted from the voltage control oscillator; and a second frequency divider for dividing a frequency of a signal frequency-divided by the first frequency divider, wherein a frequency-divided signal outputted from the first frequency divider is supplied to the CPU, a frequency-divided signal outputted from the second frequency divider is supplied to the bus, and a frequency division ratio of the first frequency divider is set higher at the power save mode. With this construction, the frequencies of the CPU clock signal and the bus clock signal can be changed at the same time.

The PLL synthesizer comprises: a PLL circuit having at least voltage control oscillating means and a first frequency divider for dividing a frequency of an oscillation signal of the voltage control oscillating means; a reference oscillator for supplying a reference signal to the PLL circuit; and a second frequency divider for dividing the frequency of the oscillation signal, wherein the oscillation signal is supplied to the CPU, a frequency-divided signal outputted from the second frequency divider is supplied to the bus, and a frequency division ratio of the first frequency divider is set lower at the power save mode. With this construction, the frequencies of the CPU clock signal and the bus clock signal can be changed at the same time by the first frequency divider for setting clock signals.

The voltage control oscillating means are alternatively selected and one of them comprises two voltage control oscillators making up the PLL circuit, wherein one voltage control oscillator is selected at the power save mode, and at a normal mode other than the power save mode, another voltage control oscillator is selected. With this construction, a stable clock signal can be obtained for any of the frequencies.

Since a frequency division ratio of the second frequency divider can be changed, the frequency of the bus clock signal can be appropriately set to meet the specifications of the computer.

The PLL synthesizer comprises: a first PLL circuit having at least voltage control oscillating means and a first frequency divider; a second PLL circuit having at least a voltage control oscillator; and a reference oscillator for supplying a reference signal to the first PLL circuit and the second PLL circuit, wherein an oscillation signal outputted from the voltage control oscillating means is supplied to the CPU, an oscillation signal outputted from the voltage control oscillator is supplied to the bus, and a frequency division ratio of the first frequency divider is set lower at a power mode. With this construction, only the frequency of the clock signal can be changed.

The voltage control oscillating means are alternatively selected and one of them comprises two voltage control oscillators making up the first PLL circuit, wherein one voltage control oscillator is selected at the power save mode, and at a normal mode other than the power save mode, another voltage control oscillator is selected. With this construction, a stable clock signal can be obtained for any of the frequencies.

The second PLL circuit is provided with a second frequency divider for setting the oscillation frequency of the voltage control oscillator, wherein the second frequency divider can be changed. With this construction, the frequency of the clock signal supplied to the bus can be set independently of the frequency of the clock signal supplied to the CPU.

What is claimed is:

1. A computer comprising:
   a CPU;
   plural peripheral devices controlled by the CPU;
   a data transmission bus between the CPU and the peripheral devices, and between the peripheral devices; and
   a clock signal source to supply clock signals for operation of the CPU and data transmission,
   wherein the clock signal source contains a PLL synthesizer.

2. The computer according to claim 1, wherein the PLL synthesizer outputs two signals whose frequencies are different from each other, one of the signals supplied as a clock signal for the CPU and the other signal supplied as a clock signal for data transmission.

3. The computer according to claim 2, wherein the PLL synthesizer includes a voltage control oscillator that outputs a first signal of the signals and a frequency divider that divides the frequency of the first signal to output a second signal of the signals from the frequency divider.

4. The computer according to claim 3, wherein a ratio of frequency division of the frequency divider is variable.

5. The computer according to claim 2, wherein the PLL synthesizer comprises:
   a first PLL synthesizer having a first voltage control oscillator; and
   a second PLL synthesizer having a second voltage control oscillator,
   wherein the first voltage control oscillator outputs one of the clock signals and the second voltage control oscillator outputs another of the clock signals.

6. The computer according to claim 5, wherein
   the first PLL synthesizer is provided with a first frequency divider that divides a frequency of an oscillation signal outputted from the first voltage control oscillator;
   wherein the second PLL synthesizer is provided with a second frequency divider that divides a frequency of an oscillation signal outputted from the second voltage control oscillator; and
   wherein the first and second frequency dividers each contain a variable frequency divider.

7. The computer according to claim 5, wherein the PLL synthesizer has a reference oscillator that supplies a reference signal commonly to the first and second PLL synthesizers.

8. A computer comprising:
   a CPU;
   plural peripheral devices controlled by the CPU;
   a data transmission bus between the CPU and the peripheral devices, and between the peripheral devices; and
   a clock signal source to supply clock signals to the CPU and the bus,
   wherein the clock signal source contains a PLL synthesizer, and wherein an output frequency of the PLL synthesizer is reduced in a power save mode.

9. The computer according to claim 8, wherein the PLL synthesizer outputs two signals whose frequencies are different from each other, with one of the signals supplied as a clock signal for the CPU and the other signal supplied as a clock signal for the bus.

10. The computer according to claim 9, wherein the PLL synthesizer comprises:
    a PLL circuit having at least a voltage control oscillator;
    a reference oscillator to supply a reference signal to the PLL circuit;
    a first frequency divider to divide a frequency of an oscillation signal outputted from the voltage control oscillator; and a second frequency divider to divide a frequency of a signal frequency-divided by the first frequency divider, wherein a frequency-divided signal outputted from the first frequency divider is supplied to the CPU, wherein a frequency-divided signal outputted from the second frequency divider is supplied to the bus, and wherein a frequency division ratio of the first frequency divider is set higher in the power save mode.

11. The computer according to claim 9, wherein the PLL synthesizer comprises:

a PLL circuit having at least voltage control oscillating means and a first frequency divider to divide a frequency of an oscillation signal of the voltage control oscillating means;

a reference oscillator to supply a reference signal to the PLL circuit; and a second frequency divider to divide the frequency of the oscillation signal, wherein the oscillation signal is supplied to the CPU, wherein a frequency-divided signal outputted from the second frequency divider is supplied to the bus, and wherein a frequency division ratio of the first frequency divider is set lower in the power save mode.

12. The computer according to claim 11, wherein the voltage control oscillating means comprises two voltage control oscillators, the voltage control oscillators being alternately selected, wherein one voltage control oscillator is selected in the power save mode, and wherein in a normal mode other than the power save mode, another voltage control oscillator is selected.

13. The computer according to claim 11, wherein a frequency division ratio of the second frequency divider is variable.

14. The computer according to claim 9, wherein the PLL synthesizer comprises:

a first PLL circuit having at least voltage control oscillating means and a first frequency divider;

a second PLL circuit having at least a voltage control oscillator; and a reference oscillator to supply a reference signal to the first PLL circuit and the second PLL circuit, wherein an oscillation signal outputted from the voltage control oscillating means is supplied to the CPU, wherein an oscillation signal outputted from the voltage control oscillator is supplied to the bus, and wherein a frequency division ratio of the first frequency divider is set lower in the power save mode.

15. The computer according to claim 14, wherein the voltage control oscillating means comprises a first and second voltage control oscillator, the first and second voltage control oscillators alternately selected, wherein the first voltage control oscillator is selected in the power save mode, and wherein in a normal mode other than the power save mode, the second voltage control oscillator is selected.

16. The computer according to claim 14, wherein the second PLL circuit is provided with a second frequency divider to set an oscillation frequency of the voltage control oscillator, and wherein the second frequency divider is variable.

* * * * *